United States Patent
Lusk et al.

[11] 3,964,048
[45] June 15, 1976

[54] COMMUNICATING OVER POWER NETWORK WITHIN A BUILDING OR OTHER USER LOCATION

[75] Inventors: Joe F. Lusk, Medford; William H. Rood, Acton, both of Mass.

[73] Assignee: General Public Utilities Corporation, New York, N.Y.

[22] Filed: Jan. 28, 1974

[21] Appl. No.: 437,184

[52] U.S. Cl. ............................ 340/310 R; 178/2 R
[51] Int. Cl.² ...................................... H04M 11/04
[58] Field of Search ................... 340/310 R, 310 A; 179/2.5 A

[56] References Cited
UNITED STATES PATENTS

| | | | |
|---|---|---|---|
| 1,607,668 | 11/1926 | Fetter | 340/310 R |
| 1,874,142 | 8/1932 | Tingley | 340/310 A |
| 2,048,091 | 7/1936 | Affel | 340/310 R |
| 2,192,061 | 2/1940 | Woodworth | 340/310 R |
| 2,481,915 | 9/1949 | Edson et al. | 179/2.5 A |
| 3,483,546 | 12/1969 | Ausfeld | 340/310 A |
| 3,659,280 | 4/1972 | Donohoo | 340/310 R |
| 3,689,886 | 9/1972 | Durkee | 340/310 A |
| 3,702,460 | 11/1972 | Blose | 340/310 A |

*Primary Examiner*—Thomas B. Habecker
*Attorney, Agent, or Firm*—Brumbaugh, Graves, Donohue & Raymond

[57] ABSTRACT

Power lines within a building or other user location are connected through a fuse and a filter to an external power grid that supplies power at the usual 50 Hz or 60 Hz. Communications apparatus such as a central computer and a number of typewriters is connected to the power lines within the building at at least two locations and transmits communications signals over the power lines. The communications signals have a frequency different from the frequency of the electrical power supplied by the external power grid and preferably in the audio range. The filter is tuned to pass the electrical power but substantially to block passage of the communications signals. Two important advantages are that the power lines within the building double as communications lines and that the building presents a purely resistive load to the external power grid, so that the grid has an improved power factor.

7 Claims, 3 Drawing Figures

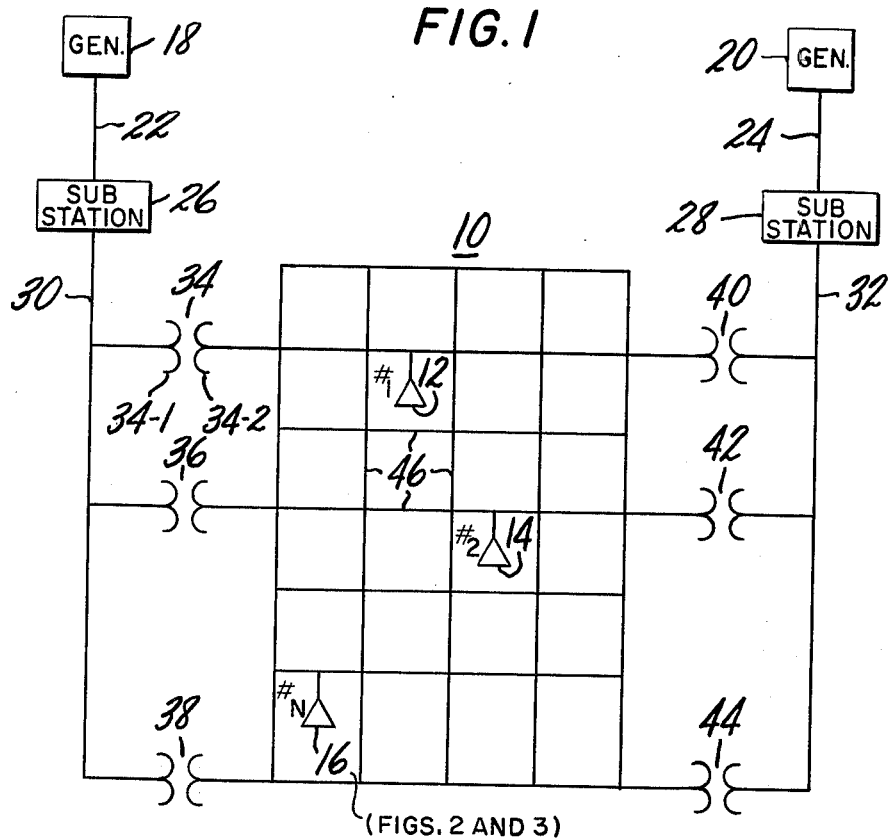

3,964,048

COMMUNICATING OVER POWER NETWORK WITHIN A BUILDING OR OTHER USER LOCATION

BACKGROUND OF THE INVENTION

This invention relates to communications and the delivery of electrical power and, more particularly, to novel and highly-effective apparatus enabling the power lines within a user location such as a building to double as communications lines and improving the power factor of an external power grid by which power is supplied to the user location.

Electrical power is conventionally supplied to user locations such as houses, apartment and office buildings, factories, military installations, and subway systems by an electric power grid external to each of the user locations. The power grid comprises one or more generating stations, substations connected to the generating stations, and a number of distribution transformers. The transformer secondary windings are connected to a network of transmission lines that supply electric power, suitably stepped down in voltage, to a number of user locations.

At each user location, power lines run from the network through a power meter and fuses and to a distribution panel. From the user distribution panel power lines extend throughout the user location to supply power for lighting, heating, operation of tools and appliances, etc.

Many user locations, especially but not exclusively larger ones, also have need of a wired system for communications within the user location. In conventional practice, this requires separate wiring, which is expensive.

SUMMARY OF THE INVENTION

An object of the present invention is to enable the power lines, which are present in any case at a user location, to double as communications lines. Another object is to improve the power factor of the external power grid.

These and other objects are attained in accordance with the invention by connecting communications means to the power lines at at least two stations within the user location and inserting filter means between the external power grid and the power lines within the user location. The electric power is of course normally delivered at 50 Hz or 60 Hz, depending on the standard adopted. In a few places, the electric power is d.c. (0 Hz). The communications means transmits signals at a different frequency, normally a higher frequency and preferably in the audio range. The filter means is tuned to pass the electric power but substantially to block passage of the communications signals. The communications signals are thus confined to the user location, which prevents their undue attentuation and can be important from a security standpoint, and the power factor of the external grid is actually improved.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 1 is a schematic view of an electric power grid supplying power to a number of user locations each equipped with apparatus according to the invention;

FIG. 2 is a schematic view of the connection in accordance with the invention between the external power grid and the power lines within each user location; and FIG. 3 is a schematic view showing communications means at at least two stations within the user location connected to the power lines within the user location and adapted to transmit communications signals over the power lines.

DESCRIPTION OF THE PREFERRED EMBODIMENTS

FIG. 1 shows an external power grid 10 for delivering electrical power at a given frequency to a number of user locations three of which are indicated at 12, 14 and 16. In practice, thousands of user locations are served by the power grid 10. The user locations can be houses, apartment and office buildings, factories, military installations, subway systems, etc. The power is generated by a number of generating stations 18, 20, connected by high-voltage transmission lines 22, 24 to substations 26, 28, respectively. The substations 26, 28 are in turn connected by transmission lines 30, 32 to distribution transformers 34, 36, 38 and 40, 42, 44, respectively. Each distribution transformer has a primary winding and a secondary winding exemplified by the windings 34-1 and 34-2, respectively, of the transformer 34. The transformers 34 through 44 are of the step-down type and reduce the voltage delivered on the lines 30, 32 to a level suitable for distribution to the user locations.

A network 46 supplies the voltage at a reduced level to the user locations 12, 14, 16, etc. The representation in FIG. 1 is of course schematic and each line in the network represents in practice a plurality of lines.

FIG. 2 shows a pair of lines 48, 50 from the external grid connected to a power meter 52 in conventional fashion. The power lines 54, 56 within the user location have conventional fuses or circuit breakers 58, 60.

In accordance with the invention, the lines 54, 56 are furthermore provided with filter means adapted to pass the electric power supplied on the lines 48, 50, which has a frequency of 50 Hz or 60 Hz, but to block signals having a substantially different frequency. To this end, the filter means preferably comprises inductors 62, 64 in the lines 54, 56, respectively, and capacitors 66, 68 in the lines 54, 56, respectively.

The filter means is tuned to the frequency of the external power grid (50 Hz or 60 Hz, as the case may be). The inductors 62, 64 present a high impedance to signals of high frequency, for example, signals in the audio range. The capacitors 66, 68 similarly block signals of low frequency. Consequently, only signals in a narrow band around the power supply frequency can pass through the filter means; all other signals are blocked.

It goes without saying that the principle of the invention is applicable regardless of the frequency of the power supplied on the lines 48, 50, so long as this frequency is different from the frequency of the communications signals. For example, if direct current is supplied on the power lines 48, 50 then inductors 62, 64 constitute a sufficient filter means, and the capacitors 66, 68 can be dispensed with.

FIG. 3 shows schematically communications means connected to the power lines 54, 56 within the user location at two stations, 70, 72. The communications means can comprise, for example, a computer 74 and a typewriter 76 connected to lines 54, 56 by terminals 78, 80, respectively. Each is adapted to transmit signals over the power lines 54, 56, as well as to draw power from those lines. The modems by which the communications signals from the communications apparatus 74, 76 are impressed on the power lines 54, 56 are conventional and well known to those skilled in the art and so are not described here.

In accordance with the invention, the communications signals are selected to have a frequency different from the frequency of the power supplied on the lines 48, 50. For example, where the external grid supplies power at a frequency of 50 Hz or 60 Hz, the communications signals may be in the audio range. The audio range is quite suitable for the transmission of teletype, voice, telemeter, etc., as those skilled in the art will appreciate.

A high degree of security is provided for communications within the user location, since the communications signals cannot pass the filter means and escape to the external power grid. Moreover, the signals are not unduly attenuated as would be the case if they were free to escape into the external power grid.

To the extent that the user locations employ the filter means of the present invention, the power factor of the entire power grid is improved, since each user location thus equipped presents a purely resistive load to the power grid.

Thus there is provided in accordance with the invention a novel and highly-effective communications system which at the same time improves the efficiency of the power grid. Many modifications of the representative embodiments disclosed herein will readily occur to those skilled in the art upon considering this disclosure. Accordingly, the invention is to be construed as including all of the embodiments thereof within the scope of the appended claims.

We claim:
1. Apparatus comprising an external power grid for delivering electrical power at a given frequency to a user location such as a building, power lines within the user location connected to the external power grid for distributing electrical power within the user location, communications means at at least two stations within the user location connected to the power lines within the user location and adapted to transmit communications signals over the power lines, the communications signals having a frequency different from the frequency of the electrical power supplied by the external power grid, and filter means inserted in series between the external power grid and the power lines within the user location, the filter means being tuned to present a closed circuit to the electrical power and thus to pass the electrical power but present substantially an open circuit to the communications signals and thus substantially to block passage of the communications signals, whereby the user location is isolated from the external power grid at the frequency of the communications signals.

2. Apparatus according to claim 1 wherein the communications means comprises terminals adapted for connection to a computer and at least one typewriter, each terminal being connected to the power lines within the user location and adapted to transmit and receive communications signals over the power lines.

3. Apparatus according to claim 1 wherein the frequency of the electrical power is substantially within the range of 50 Hz to 60 Hz and the frequency of the communications signals is above 60 Hz.

4. Apparatus according to claim 3 wherein the frequency of the communications signals is in the audio range.

5. Apparatus according to claim 1 wherein the filter means comprises inductor means and capacitor means connected in series with each other.

6. Apparatus according to claim 5 further comprising fuse means connected in series with the inductor means and the capacitor means.

7. A power grid for delivering electrical power at a given frequency to a plurality of user locations and, in series with each of said user locations, filter means tuned to said given frequency in order to present a closed circuit to the electrical power and thus readily to pass the electrical power to said user locations but to present substantially an open circuit to signals of other frequencies and thus substantially to block the passage of signals of other frequencies, said user locations presenting a substantially resistive load to the power grid and the user locations being isolated from the power grid at said other frequencies.

* * * * *